United States Patent [19]
Contal et al.

[11] 4,414,819
[45] Nov. 15, 1983

[54] TEMPORARILY RIGIDIFYING SOFT MATERIALS

[75] Inventors: Francois Contal, Grenoble; Bernard Boyer, Sassenage, both of France

[73] Assignee: L'Air Liquide, Societe Anonyme pour l'Etude et l'Exploitation des Procedes Georges Claude, Paris, France

[21] Appl. No.: 372,313

[22] Filed: Apr. 27, 1982

[30] Foreign Application Priority Data

May 8, 1981 [FR] France .............................. 81 09151

[51] Int. Cl.³ .............................................. F25B 41/04
[52] U.S. Cl. ....................................... 62/222; 62/331; 62/374
[58] Field of Search ................. 62/57, 63, 380, 374, 62/216, 222–224, 331

[56] References Cited

U.S. PATENT DOCUMENTS

| | | | |
|---|---|---|---|
| 3,600,901 | 8/1971 | Wagner | 62/380 |
| 3,670,520 | 6/1972 | Bonteil | 62/57 |
| 3,738,121 | 6/1973 | Swindell | 62/57 |
| 3,898,863 | 8/1975 | Wagner | 62/374 |
| 3,932,155 | 1/1976 | Pietrucha et al. | 62/76 |
| 3,953,270 | 4/1976 | Ford . | |
| 4,090,369 | 5/1978 | Le Diouron | 62/63 |

FOREIGN PATENT DOCUMENTS

| | | |
|---|---|---|
| 2422898 | 11/1975 | Fed. Rep. of Germany . |
| 2701120 | 7/1978 | Fed. Rep. of Germany . |
| 2051961 | 4/1971 | France . |
| 2117767 | 7/1972 | France . |
| 2138376 | 1/1973 | France . |
| 2353386 | 12/1977 | France . |
| 2448119 | 8/1980 | France . |
| 1357886 | 6/1974 | United Kingdom . |

*Primary Examiner*—Ronald C. Capossela
*Attorney, Agent, or Firm*—Young & Thompson

[57] ABSTRACT

This invention relates to apparatus for temporarily rendering rigid a product of soft material of elongated form such as a rubber tube. In this apparatus, a tube of the product penetrates into a tunnel and issues therefrom after having been cooled by liquid nitrogen vaporized in an exchanger. A part of the nitrogen travels in counterflow and another predetermined part thereof travels in equidirectional flow towards a processing station.

The invention is particularly applicable to braiding or winding rubber tubes, but is not limited to this field of use.

2 Claims, 2 Drawing Figures

TEMPORARILY RIGIDIFYING SOFT MATERIALS

BACKGROUND OF THE INVENTION

The present invention relates to apparatus for temporarily rendering rigid a product of soft material of very elongated form before said product runs past and in front of a working station, of the kind in which said product is cooled down to the stiffening temperature in a liquid nitrogen refrigerating tunnel, with a refrigerating duct of said tunnel comprising an upstream part in the direction of traversal of said product which has an internal transverse outline having greater dimensions than those of the internal transverse outline of a downstream part of said duct. Hereinafter such a method will be referred to as "of the kind described."

It has been observed that the application of a liquid nitrogen tunnel lent itself more satisfactorily to this kind of operation by virtue of its very low temperature ($-196°$ C.) than the mechanical refrigerating appliances which do not ensure the absence of moisture at the location of the processing station and which, by virtue of this fact, commonly require auxiliary drying means.

The application of liquid nitrogen is of greater interest than that of carbon dioxide, whether in solid or liquid form, the temperature of which is inadequate to secure rapid cooling, and the handling of which in the case of solid carbon dioxide requires the use of labour for its immersion in a refrigerated bath commonly consisting of methanol. Although the conditions of application of liquid nitrogen lend themselves remarkably well to the technique for cold-stiffening a soft product of rubber or plastics material, a high cost frequently represents an obstacle, which derives from a comparatively high consumption combined with an extremely low thermal efficiency.

It is an object of the invention to increase the thermal efficiency of such rigidifying or stiffening operations utilising liquid nitrogen, in such manner as to render liquid nitrogen economically competitive with the other sources of cold commonly utilised. Another object of the invention is to provide a refrigerating or freezing tunnel of uncomplicated structure, in respect of the heat exchangers in particular, and furthermore in automating all the functions of such freezing tunnel.

SUMMARY OF THE INVENTION

To achieve these and other objects in apparatus of the kind described, the invention consists in that the transverse outline of the said upstream tunnel section matching the transverse configuration of said product, has dimensions only a little greater than those of said downstream section, and cold nitrogen is fed into a middle area of said duct, the whole being arranged so that a considerable delivery volume of vaporized precooling nitrogen flows in counterflow with respect to the product, whereas a small rate of delivery of vaporised nitrogen flows equidirectionally.

This renders it possible to secure substantial advantages regarding maximum recovery of cold whilst maintaining a residual equidirectional rate of flow directed downstream, which keeps the product in the cold state and ensures an adequate stiffening action upon its egress from the freezing tunnel, where the processing station is commonly situated.

A thermometric probe or sensor advantageously measures the temperature of the vaporized nitrogen close to a terminal section of the downstream duct section and ensures governing of the rate of flow of liquid nitrogen supplied in such manner as to keep said temperature constant at the precise level of the rigidifying or stiffening temperature. In practice, experience has shown that the gap cross-section between the product and the downflow duct section is comprised between 65% and 75% of the gap cross-section between the product and the upstream duct section. The nitrogen flow in equidirectional flow is preferably of the order of 35% of the nitrogen flow in counterflow.

BRIEF DESCRIPTION OF THE DRAWINGS

In order that the invention may be more clearly understood, reference will now be made to the accompanying drawings which show one embodiment of apparatus according thereto and in which.

DETAILED DESCRIPTION OF PREFERRED EMBODIMENT

Figure 1:
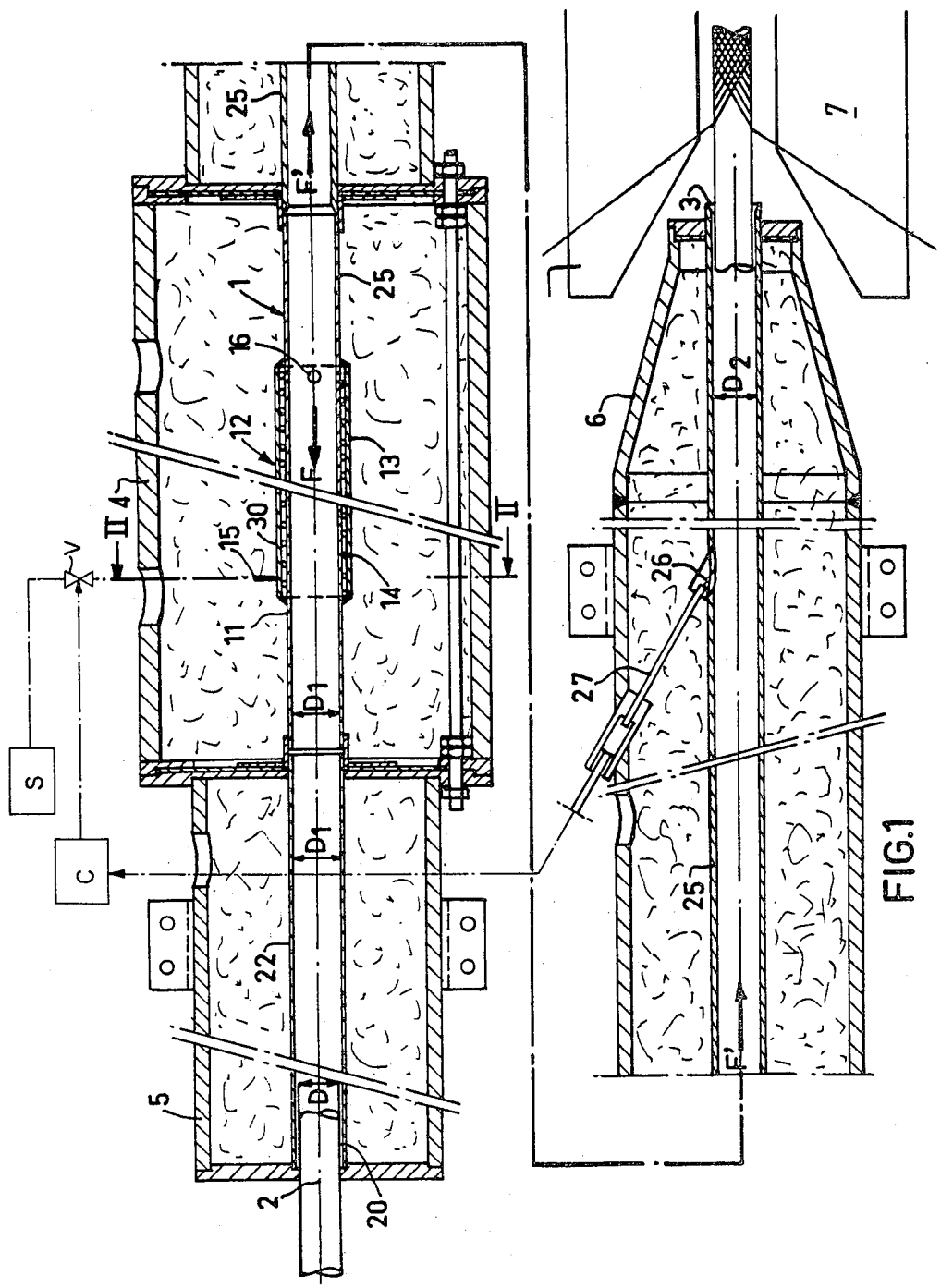
FIG. 1 is a view in axial section of a freezing tunnel in accordance with the invention.
Figure 2:
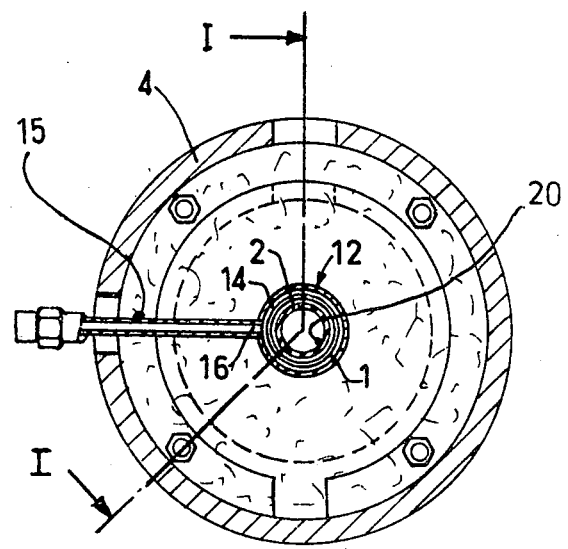
FIG. 2 is a cross-section along the line II—II of FIG. 1.

Referring now to the accompanying drawings, it will be apparent that the freezing tunnel shown therein essentially comprises an elongated duct 1 extending from an inlet 2 to an outlet 3, and this duct is sheathed in heat insulation sleeves 4, 5 and 6, this latter having a cross-section diminishing gradually towards the outlet 3, in such manner as to provide the space for a processing device 7, which latter will be described hereinafter. In practice, the freezing duct 1 comprises a central section 11 a central portion 12 of which is enclosed at a distance by a wall 13 incorporating an axial spiral 14 thus forming a heat exchanger connected at the upstream end via a pipe 15 to a source S of liquid nitrogen and at the downstream end leading to several pipe perforations 16 within the duct 1. In the embodiment, the purpose is to freeze a cylindrical rubber tube 20, and therefore the whole of the duct 1 has a cylindrical shape. The central section 11 of the duct 1 has an internal diameter $D_1$ a little greater than the external diameter D of the rubber tube, in such manner as to form an interstitial volume for flow of vaporized gas between the rubber tube 20 and the duct 1. At the upstream end, the duct section 11 has connected to it a duct section 22 which has the same internal diameter $D_1$ as the central section 11, the upstream end of which forms the inlet 2. Downstream of the duct section 11, the duct 1 has a duct section 25 which has an equally cylindrical section, which is similar to the cross-sections of the duct sections 12 and 22 but has a diameter $D_2$ of lesser size and, expressed in percent, the gap cross-section in this downstream duct section 25 is comprised between 65% and 75% of the gap cross-section in the duct sections 11 and 22. Close to its downstream end, a sensor 27 is situated in a recess 26 and this sensor 27 is connected to a control device C which provides control for an automatic valve V installed on the liquid nitrogen pipe 15.

During operation, a rubber tube 20 at ambient temperature, that is to say in the comparatively soft state, is inserted via the inlet 2 and travels in continuous manner within the duct 1 and before the processing station 7 which, for example, is a braiding or winding station. It will be understood that the braiding or winding operation which consists in sheathing a tube with a steel or textile reinforcement requires that the rubber tube, which then forms a mandrel, should be made stiff at least temporarily. To this end, liquid nitrogen fed into the exchanger 30 formed by the walls 12, 13 and the coil 14, is fed into the inside of the duct 1 into the interstitial volume between the duct 1 and the rubber tube 20 via the orifices 16 and flows at a comparatively high rate of flow in the direction of the arrow F in counterflow as regards the rubber tube 20 and at a predetermined rate of flow in the direction of the arrow F' in equidirectional flow as regards the rubber tube. The sensor 27 is adjusted in such manner that the rate of flow of liquid nitrogen is just sufficient for the rubber tube 20 to be at the stiffening temperature at the outlet 3 of the tunnel 1. If, for any reason, the temperature of the tube 20 exceeds that required, this discrepancy is detected by the sensor 27 which immediately causes the rate of flow of liquid nitrogen to increase, either by recurrent opening of a valve or by increased valve opening. If, on the contrary, the temperature at the point of the sensor 26 is too low, a reverse corrective action intervenes.

The advantage will be noted of the method which has been described, in which a vaporized nitrogen flow flowing downstream provides different functions, the main one of which is a function sustaining the cooling of the product processed, which is enhanced during the stoppages of the braiding or winding machine, in such manner that the tube portion immobilised outside the tunnel prior to braiding or winding is kept cooled during any stoppage of the braiding machine.

This results in perfect manufacturing continuity, despite the stoppages, and in eliminating production faults which had occurred until now as a consequence of each stoppage of the braiding or winding machine. On the other hand, a stiffening action on this product is provided at the level of the processing station and above all, by virtue of its low rate of flow, this vaporized nitrogen represents a device extremely sensitive to any temperature variation which may easily be detected by the sensor and thus corrected.

While the invention can be applied in particular to the braiding or winding of a reinforcement or sheathing on a rubber or plastics tube, it will be apparent that this is merely an example of its field of use.

What we claim is:

1. An apparatus for temporarily rendering rigid a product of soft material of very elongated form before said product reaches a processing station, said apparatus comprising a tunnel of elongated shape, the tunnel comprising a refrigerating duct having an internal transverse outline matching with radial clearance an outer transverse configuration of said product from an entrance end to an exit end of the tunnel, the duct comprising an upstream section and a downstream section with respect to the direction of travel of said product, the upstream section being provided with a heat exchanger, the heat exchanger comprising conduit means connected to a source of liquid nitrogen and opening into the duct upstream section, the internal transverse outline of the duct upstream section having greater dimensions than those of the internal transverse outline of the duct downstream section, whereby a comparatively high rate of flow of vaporized nitrogen travels in counterflow with respect to the product, whereas a comparatively small rate of flow of vaporized nitrogen flows equidirectionally with respect to the product.

2. Apparatus according to claim 1, wherein a thermometric sensor is situated in an area of the duct close to the exit end of the tunnel, the sensor being connected to means for controlling the flow rate of liquid nitrogen to said heat exchanger.

* * * * *